United States Patent
Yau

(10) Patent No.: US 9,703,884 B2
(45) Date of Patent: Jul. 11, 2017

(54) PLANE MEDIA PRODUCT SUPPORTING INTERACTIVE INTERCONNECTED SYSTEM

(71) Applicant: Yimwai Yau, Hong Kong (CN)

(72) Inventor: Yimwai Yau, Hong Kong (CN)

(73) Assignee: Yimwai Yau, Hong Kong (CN)

( * ) Notice: Subject to any disclaimer, the term of this patent is extended or adjusted under 35 U.S.C. 154(b) by 0 days.

(21) Appl. No.: 14/772,778

(22) PCT Filed: Mar. 4, 2014

(86) PCT No.: PCT/CN2014/072846
§ 371 (c)(1),
(2) Date: Nov. 28, 2015

(87) PCT Pub. No.: WO2014/135062
PCT Pub. Date: Sep. 12, 2014

(65) Prior Publication Data
US 2016/0125090 A1    May 5, 2016

(30) Foreign Application Priority Data

Mar. 4, 2013  (CN) .................... 2013 2 0099660 U
Mar. 4, 2013  (CN) .................... 2013 2 0099685 U
(Continued)

(51) Int. Cl.
*G06F 17/00*   (2006.01)
*G06F 17/30*   (2006.01)
(Continued)

(52) U.S. Cl.
CPC .  *G06F 17/30887* (2013.01); *G06K 19/06037* (2013.01); *H04N 21/4126* (2013.01);
(Continued)

(58) Field of Classification Search
USPC .................................. 235/375, 383, 462.01
See application file for complete search history.

(56) References Cited

U.S. PATENT DOCUMENTS 7,253,919 B2 *  8/2007  Hull .................. G06F 17/30017
                                             235/462.01
7,743,347 B2 *  6/2010  Graham ................ G06F 3/1206
                                             235/462.01
(Continued)

*Primary Examiner* — Tuyen K Vo
(74) *Attorney, Agent, or Firm* — PROI Intellectual Property US

(57) ABSTRACT

A plane media product supporting an interactive interconnected system supports transmit-receive of a multimedia information signal. The interactive interconnected system comprises an electronic reading device and an electronic transmitter-receiver. An external surface of the plane media product may be attached with information content. The multimedia information signal is synthesized by media information data and associated data, which is a preset Uniform Resource Identifier. The electronic transmitter-receiver is provided with an associated data reception circuit, an associated data transmission circuit and a central processing unit (with memory). The associated data reception circuit is equipped with a short-distance signal transmission-reception circuit. The electronic transmitter-receiver is configured to control transmit-receive of the associated data of the decomposed multimedia information signal, receive the associated data decomposed by the transmission circuit of the electronic reading device, transmit the associated data to external via a remote wireless technology, and quickly call out an associated electronic file.

12 Claims, 12 Drawing Sheets

(30) Foreign Application Priority Data

Oct. 8, 2013 (CN) .................... 2013 2 0626488 U
Jan. 4, 2014 (CN) .................... 2014 2 0028396 U

(51) Int. Cl.
    *H04W 4/00*         (2009.01)
    *H04N 21/41*        (2011.01)
    *H04N 21/426*      (2011.01)
    *H04N 21/4725*     (2011.01)
    *G06K 19/06*       (2006.01)

(52) U.S. Cl.
    CPC ... *H04N 21/42653* (2013.01); *H04N 21/4725* (2013.01); *H04W 4/008* (2013.01)

(56) References Cited

U.S. PATENT DOCUMENTS

| | | | |
|---|---|---|---|
| 2006/0072779 A1* | 4/2006 | Erol | G06T 11/001 382/100 |
| 2007/0055689 A1* | 3/2007 | Rhoads | G06F 17/30026 |
| 2007/0078904 A1* | 4/2007 | Yoon | G06F 17/3089 |
| 2007/0174624 A1* | 7/2007 | Wolosewicz | G06F 21/10 713/176 |
| 2008/0023371 A1* | 1/2008 | Macor | B65D 85/58 206/775 |
| 2012/0030041 A1* | 2/2012 | Wolosewicz | G06Q 30/0277 705/14.73 |
| 2012/0233174 A1* | 9/2012 | Hudetz | G06F 17/30879 707/741 |
| 2012/0241516 A1* | 9/2012 | Zuleeg | G06F 15/173 235/375 |

* cited by examiner

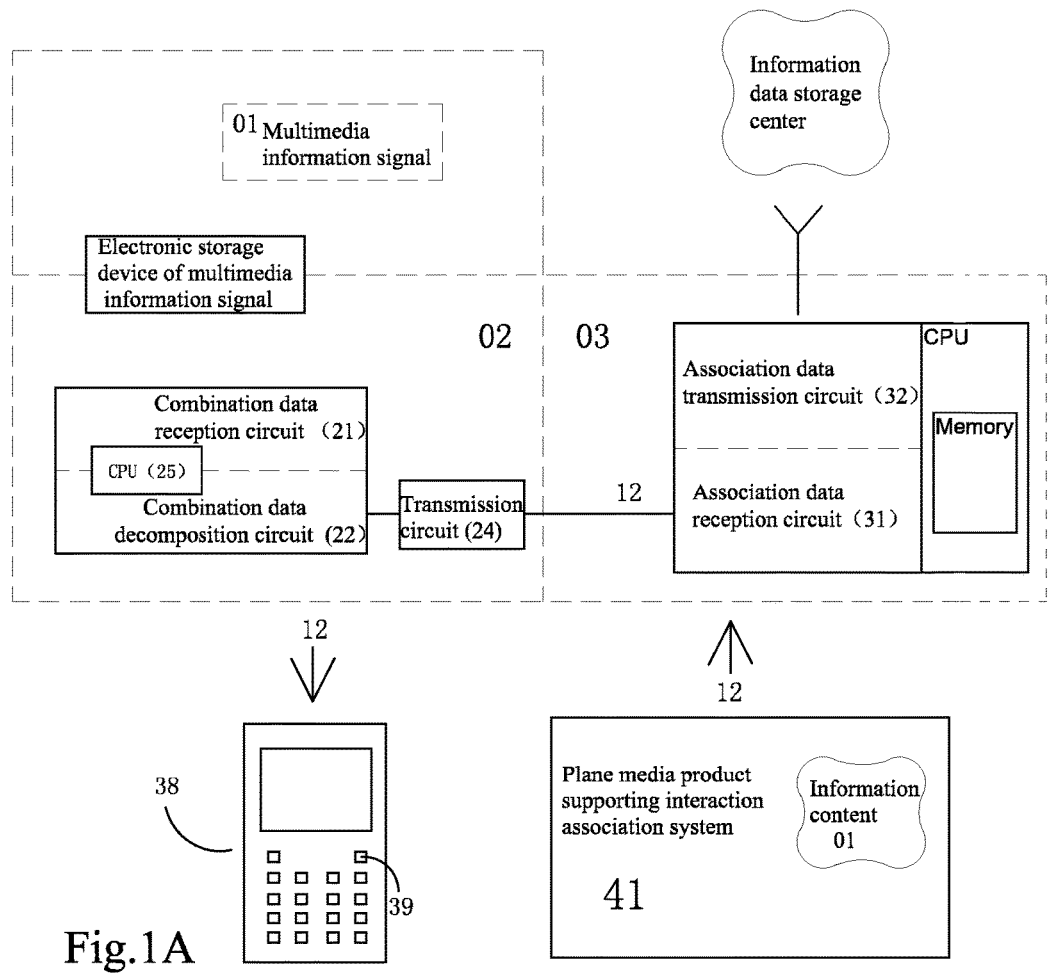
Fig.1A
Fig.1B
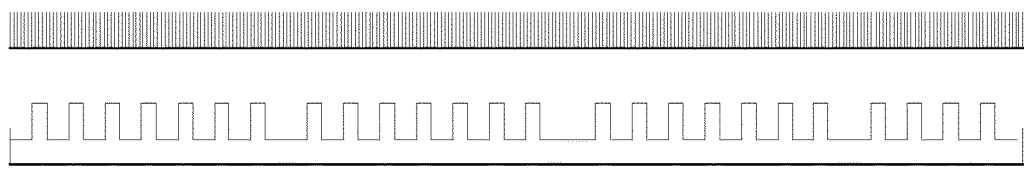
Information content

PLANE MEDIA PRODUCT SUPPORTING INTERACTIVE INTERCONNECTED SYSTEM

CROSS REFERENCE TO RELATED APPLICATIONS

The present application is the US national stage of International Patent Application PCT/CN2014/072846 filed on Mar. 4, 2014, which, in turn, claims priority to Chinese Patent Applications CN 201320099685.0 filed on Mar. 4, 2013, CN 201320099660.0 filed on Mar. 4, 2013, CN 201320626488.X filed on Oct. 8, 2013, and CN 201420028396.6 filed on Jan. 4, 2014.

TECHNICAL FIELD

The invention relates to an information association technology of a cross-media product, in particular to a plane media product supporting an interactive interconnected system for achieving barrier-free development of information.

BACKGROUND ART

With the rapid development of a broadband wireless access technology and a mobile terminal technology, people have an urgent hope to be able to obtain information and service from Internet conveniently at will in a mobile process whenever and wherever possible.

However, mobile Internet is not mobilized Internet, but is a generic term of activities of combination and practice of technologies, platforms, commercial modes and applications of the Internet, and mobile communication technologies.

Mobile terminals will be more networked and socialized in the future. How will the boring fragmented time of the people be made full use of? Such boring fragmented time is isolated and short. Since a mobile phone and other intelligent terminals are closest to the people, they can be considered as a constituent part of the people.

As the mobile phone becomes a mobile carrier in an information network, the mobile phone is not just a tool for making a call and sending short messages any longer, but is a miniature computer which can achieve ultimate combination of communication and the Internet to enable people to enter the era of mobile informatization really.

The mobile informatization is to realize comprehensive application of an information system on a handheld terminal such as the mobile phone in a manner of fusion of communication technologies such as telecommunications, broadcast and the Internet to achieve the purpose of obtaining relevant information whenever and wherever possible at will at last.

Although the transmission capacity of a traditional media advertisement product is lower than that of electronic media obviously, electronic media are not an "ultimate media form which can replace any one of the traditional print paper media, traditional broadcast, traditional television, traditional Internet and the like" praised highly by some people.

How do Matters Stand?

The development of the electronic media still has serious defects and deficiencies. Due to the lack of relevant technical support for achieving cross-media information interaction association, so-called omni-media is just to prepare the information content of the plane media into an electronic edition to be provided for a user to select.

With the development of a new generation broadcast technology based on DAB (Digital Audio Broadcasting), DVB (Digital Video Broadcasting), DMB (Digital Media Broadcasting) and the like, scientific and technical workers all over the world try hard to solve the relevant problems, for example Chinese invention patents 200310113194.8, 200610072903.6, 200580034624.4, 200620039633.4 and the like, which only effectively improve the transmission capacity of the information.

The smart phone shall log in the relevant electronic Internet of the cross-media product information to obtain richer relevant information epitaxially, the association technology is a non-spanning necessity, and the association technology and a transmission technology are two technical purposes of different concepts.

The existing association technology on the market is mainly a QR code pattern technical scheme. Although the QR code pattern technical scheme has become a mature product and industrial chain, there are many technical use condition limits in actual operation, as follows:

1. The smart phone can carry out capturing after downloading an appropriate application.
2. Definition of a QR code pattern.
3. Light during capturing of the QR code pattern.
4. Distance for capturing of the QR code pattern.
5. The QR code patterns are different in size (including 8 mm*8 mm, 10 mm*10 mm . . . 100 mm*100 mm, etc.), and the appearance attractiveness of an advertisement board is influenced with the QR code patterns.

If the QR code patterns are implanted into a screen frame and a webpage of a video product . . . during the actual operation, an electronic screen displays the QR code patterns for a very short time, and the user operation is difficult.

In addition, the QR code pattern technical scheme is powerless to achieve broadcast (an audio information technology) association with a multimedia information signal . . . .

Therefore, a simpler and quicker interaction association technology with a high effect for randomly meeting the requirements anytime and anywhere is an urgent hope for the market.

The interactive interconnected system provided by the invention is a technology for achieving barrier-free transmission of the cross-media product information.

SUMMARY

In order to achieve the above purposes, the invention provides a plane media product supporting an interactive interconnected system. The plane media product supports transmit-receive of a multimedia information signal of the interactive interconnected system, and is characterized in that the interactive interconnected system comprises an electronic reading device and an electronic transmitter-receiver;

an information content can be attached to an external surface of the plane media product;

the multimedia information signal is formed by media information data and associated data synthesis;

the associated data is a preset URI (Uniform Resource Identifier);

the electronic reading device is provided with a combination data reception circuit, a combination data decomposition circuit and a transmission circuit; the combination data reception circuit is configured to receive the multimedia information signal; the combination data decomposition circuit is configured to decompose the multimedia information signal into the media information data and the associated data; the decomposed associated data is transmitted to the electronic transmitter-receiver via the transmission circuit;

the electronic transmitter-receiver is provided with an associated data reception circuit, an associated data transmission circuit and a central processing unit (with memory);

the associated data reception circuit is equipped with a short-distance signal transmission-reception circuit; and the electronic transmitter-receiver is mainly configured to control transmit-receive of the associated data of the decomposed multimedia information signal, receive the associated data decomposed by the transmission circuit of the electronic reading device, transmit the associated data to an external information data storage center via a remote wireless technology, and quickly call out an associated electronic file.

An identification mark is attached to the external surface of the information content.

The plane media product is a fixed article.

The plane media product is a mobile article.

The electronic reading device is provided with the combination data reception circuit, the combination data decomposition circuit, the transmission circuit, and a CPU (Central Processing Unit) module board, which are embedded into the plane media product supporting the interactive interconnected system; and the electronic transmitter-receiver is provided with an associated data reception circuit, an associated data transmission circuit and a central processing unit (with memory), which are embedded into a communication terminal product of the interactive interconnected system.

The combination data reception circuit, the combination data decomposition circuit, the transmission circuit, and the CPU module board of the electronic reading device, as well as the associated data reception circuit, the associated data transmission circuit and the CPU module board (comprising the memory) of the electronic transmitter-receiver are placed in the plane media product.

The electronic reading device is provided with the combination data reception circuit, the combination data decomposition circuit, the transmission circuit, and the CPU module board, which are placed in a small data box.

the transmission circuit of the electronic reading device is equipped with the short-distance signal transmission-reception circuit;

the combination data decomposition circuit of the electronic reading device is configured to decompose the multimedia information signal into the media information data that includes digital data, video data, audio data, program data, and the like;

the digital data after the decomposition of the media information data is transmitted to the related configuration for use after transmitted to a digital data system for processing;

The video data after decomposition of the media information data is transmitted to related configuration for use after transmitted to a video system for processing;

The audio data after the decomposition of the media information data is transmitted to the related configuration for use after transmitted to an audio system for processing; and the program data after the decomposition of the media information data is transmitted to the related configuration for use after transmitted to a program system for processing; and the decomposed associated data is transmitted by the transmission circuit and the equipped short-distance signal transmission-reception circuit.

The multimedia information signal is transmitted by a signal transmission station and a signal transmission transfer device.

The associated data received by the electronic transmitter-receiver is from various transmission approaches, and the electronic transmitter-receiver is connected with an electronic storage device of the multimedia information signal supporting the interactive interconnected system for reception.

The invention provides a plane media product supporting an interactive interconnected system, which realizes the interaction association of cross-media information products and achieves the goal of barrier-free information:

1. The plane media product may acquire the relevant associated data from the multimedia information signal supporting the interactive interconnected system, and the related associated data is transmitted synchronously as a quick entry point of an electronic webpage to meet random technical requirements of the mobile informatization anytime and anywhere.

2. Due to the technical combination characteristic of the interactive interconnected system, original functions of the product are not changed, and combined functions can support mutually to achieve an obvious technical effect, the barrier-free association of the cross-media product information may be achieved by the simplest point-to-point association technology, and the interaction association capacity of the interactive interconnected system is obviously better than that of the existing QR code and other association technology solutions on the market.

The invention has the particular contribution that the associated data can be transmitted by taking various approaches, so that the invention solves the technical problem of information congestion in the mobile informatization development effectively, and assists in improving the existing traffic light facility by using the existing social resources of advertisement boards in bus shelters, and the visually impaired people obtain help of voice guide and relevant traffic information service via the communication terminal product (such as a smart phone) supporting the interactive interconnected system.

BRIEF DESCRIPTION OF THE DRAWINGS

FIG. 1A is an operation diagram of a plane media product to obtain single associated data;

FIG. 1B is a principle diagram of a plane media product to obtain single associated data;

DETAILED DESCRIPTION OF PREFERRED EMBODIMENTS

Figure 1C:
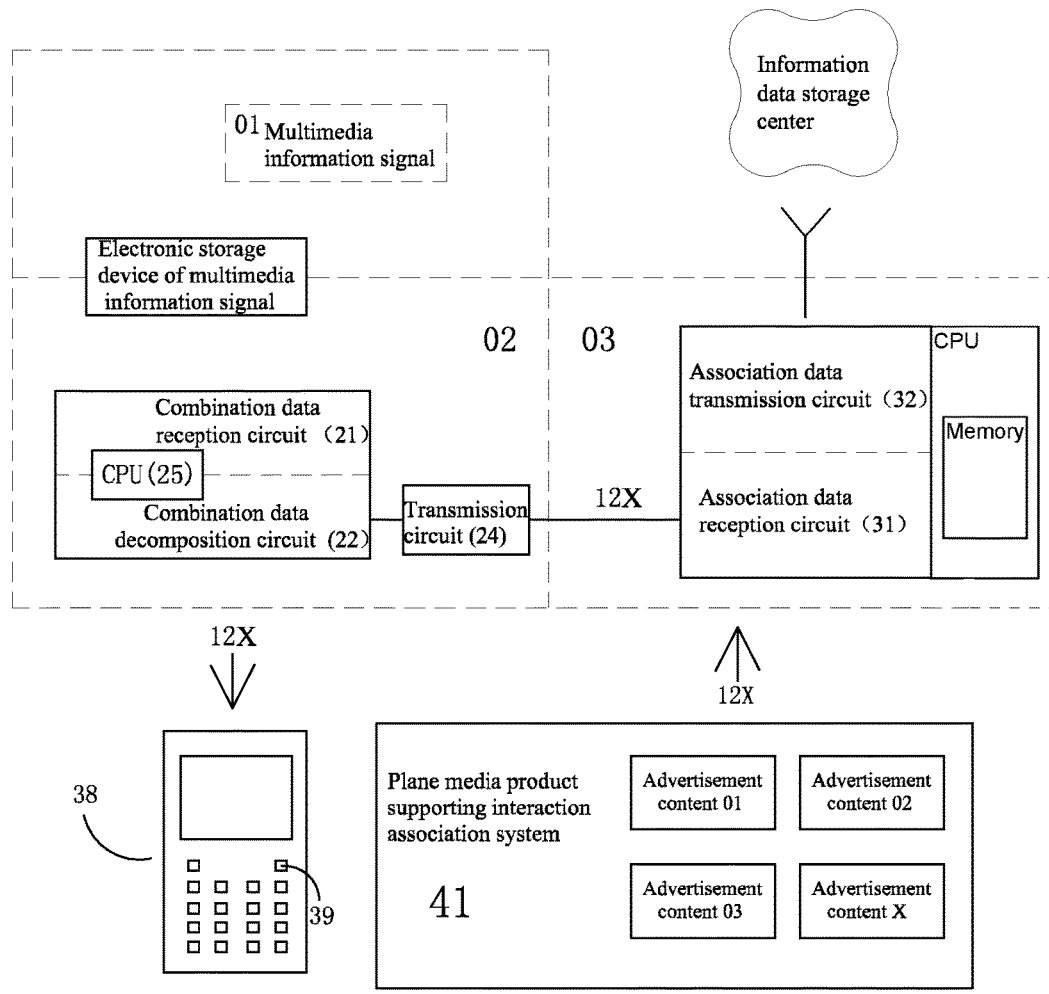
FIG. 1C is an operation diagram of a plane media product to obtain multiple associated data.

The following embodiments further explain and describe the invention, and do not constitute any limit to the invention;

the invention provides a plane media product supporting an interactive interconnected system, and the plane media product 41 supports transmit-receive of a multimedia information signal 01 of the interactive interconnected system and is characterized in that the interactive interconnected system comprises an electronic reading device 02 and an electronic transmitter-receiver 03;

an information content can be attached to an external surface of the plane media product;

the multimedia information signal is synthesized by media information data and associated data 12;

the associated data is a preset URI (Uniform Resource Identifier);

as shown in FIG. 1A, the electronic reading device is provided with a combination data reception circuit 21, a combination data decomposition circuit 22 and a transmission circuit 24; the combination data reception circuit is configured to receive the multimedia information signal; the combination data decomposition circuit 22 is configured to decompose the multimedia information signal into the media information data and the associated data; the decomposed associated data is transmitted to the electronic transmitter-receiver via the transmission circuit 24;

the electronic transmitter-receiver is provided with an associated data reception circuit 31, an associated data transmission circuit 32 and a central processing unit (with memory);

the associated data reception circuit 31 is equipped with a short-distance signal transmission-reception circuit;

the short-distance communication technology includes NFC and Bluetooth technology, etc.; and the electronic transmitter-receiver is mainly configured to control transmit-receive of the associated data of the decomposed multimedia information signal, receive the associated data decomposed by the transmission circuit of the electronic reading device, transmit the associated data to an external information data storage center via a remote wireless technology, and quickly call out an associated electronic file.

The remote communication technology includes GSM (Global System for Mobile), CDMA (Code Division Multiple Access), GPRS (General Packet Radio Service) and other technologies.

The external information data storage center may be a memory of a related product, Internet, cloud storage and the like, or a built-in memory of the electronic reading device.

The called electronic file is viewed by a visual electronic screen product, including an electronic terminal product, a communication terminal product, a computer, a plane media product and the like supporting an interaction association technology.

As shown in FIG. 1B, one single information content is shown, only one single associated data (namely a single URI (Uniform Resource Identifier)) is required to be set for the information content, and multiple replication and cyclic transmission are set for the associated data within reading time of a media information content.

An identification mark is attached to the external surface of the information content. An electronic reading code corresponds to the identification mark. In order for simple operation, the identification mark is set by the simplest figure, or a symbol or a character.

As shown in FIG. 1C, the associated data is an associated data group 12X as a combination of more than one associated data, and the different URIs (Uniform Resource Identifiers) are set for the different associated data respectively.

Figure 1D:
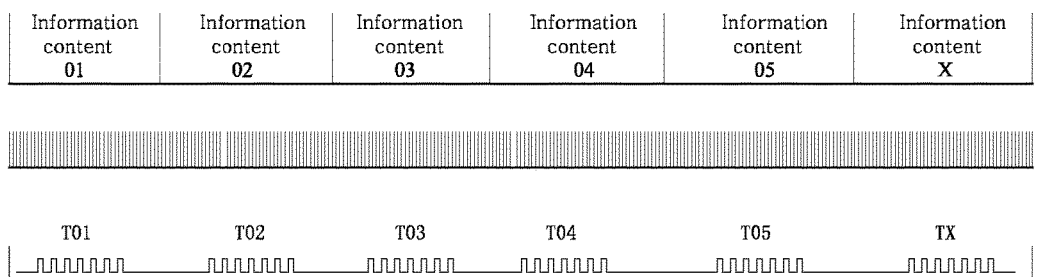
FIG. 1D is a principle diagram of a plane media product to obtain multiple associated data.

As shown in FIG. 1D, six information contents are shown, and correspond to the six associated data (namely the six URIs (Uniform Resource Identifiers)), and the different URIs (Uniform Resource Identifiers) are associated with different electronic files . . . .

The URI (Uniform Resource Identifier) T01 corresponds to the information content 01 . . . .

The URI (Uniform Resource Identifier) T05 corresponds to the information content 05 . . . .

The URI (Uniform Resource Identifier) TX corresponds to the information content X . . . .

The multiple replication and cyclic transmission are set for the different associated data within the reading time of the six different media information contents.

The associated data sets an electronic reading code 14, the different electronic reading codes correspond to the different associated data, and the different URIs (Uniform Resource Identifiers) are set for the different associated data respectively.

The plane media product is a fixed article.

The plane media product is a mobile article.

The existing technical scheme on the market is as follows.

Figure 3A:
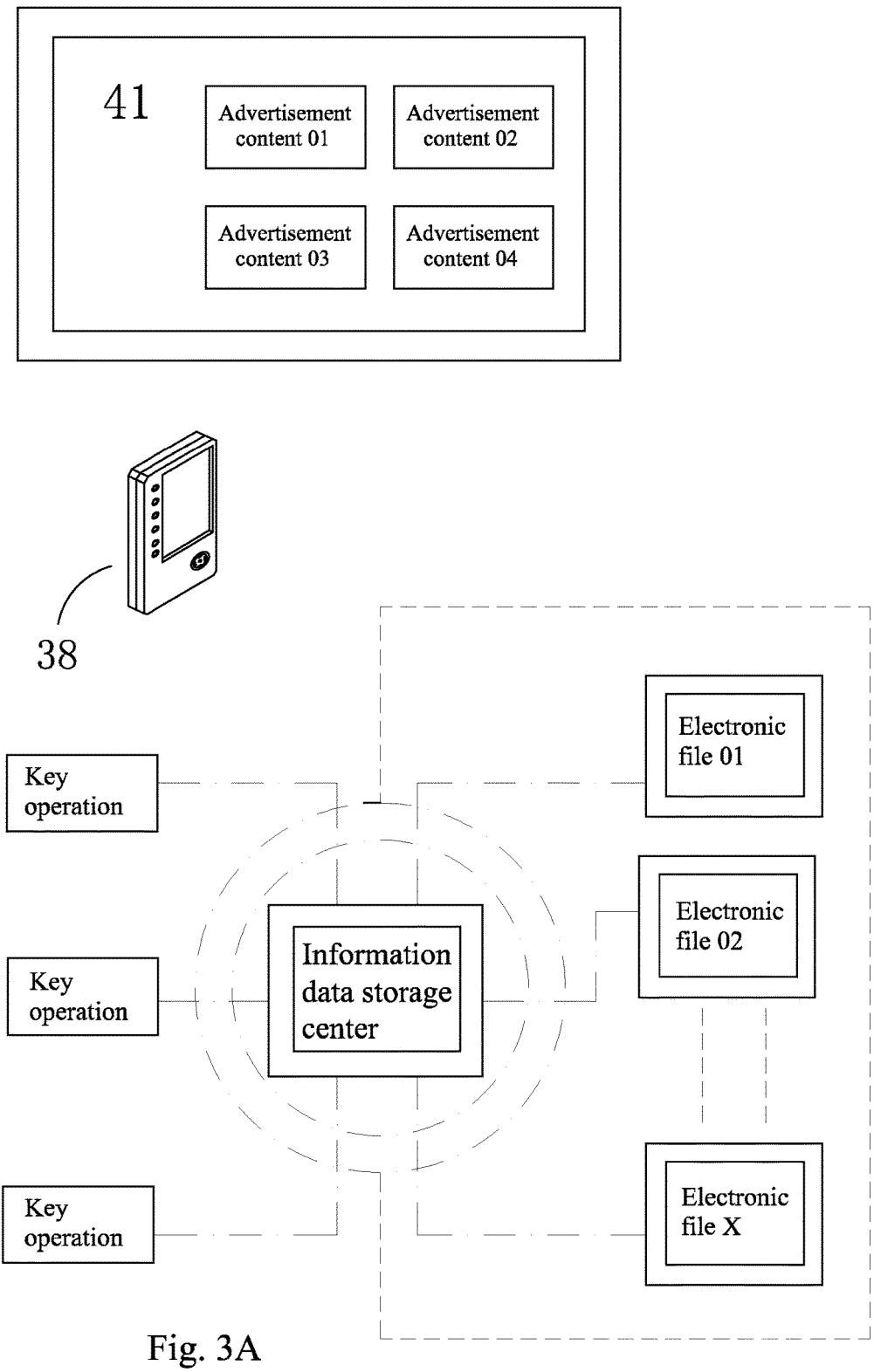
FIG. 3A is a schematic diagram of an interaction association method of a traditional plane media product.

As shown in FIG. 3A, the information content of the plane media product (such as a print advertisement board and an outdoor bus shelter) is a planar information technology, and an effect of a traditional smart phone to obtain the information content of the print advertisement board is obviously poorer than that of electronic media.

In order to improve the transmission effect of the plane media product, there're various technical solutions on the market. One technical solution is a QR code technical solution. Relevant application examples are as follows.

Figure 3B:
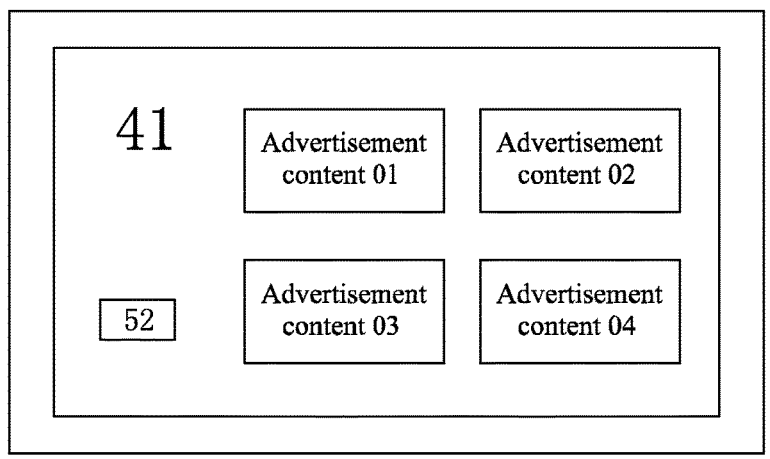
FIG. 3B is a schematic diagram of an interaction association method of a traditional plane media product adopting a QR code pattern.
Figure 3B:
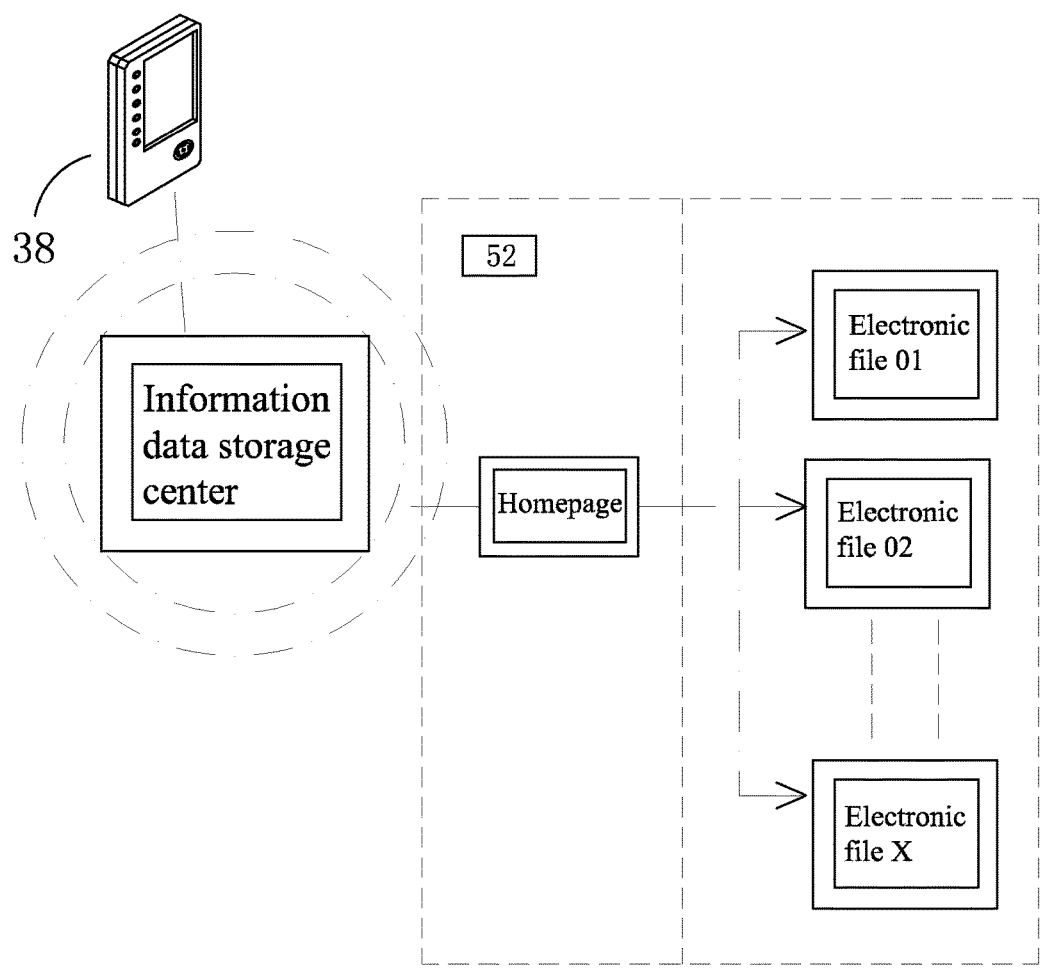
Figure 3C:
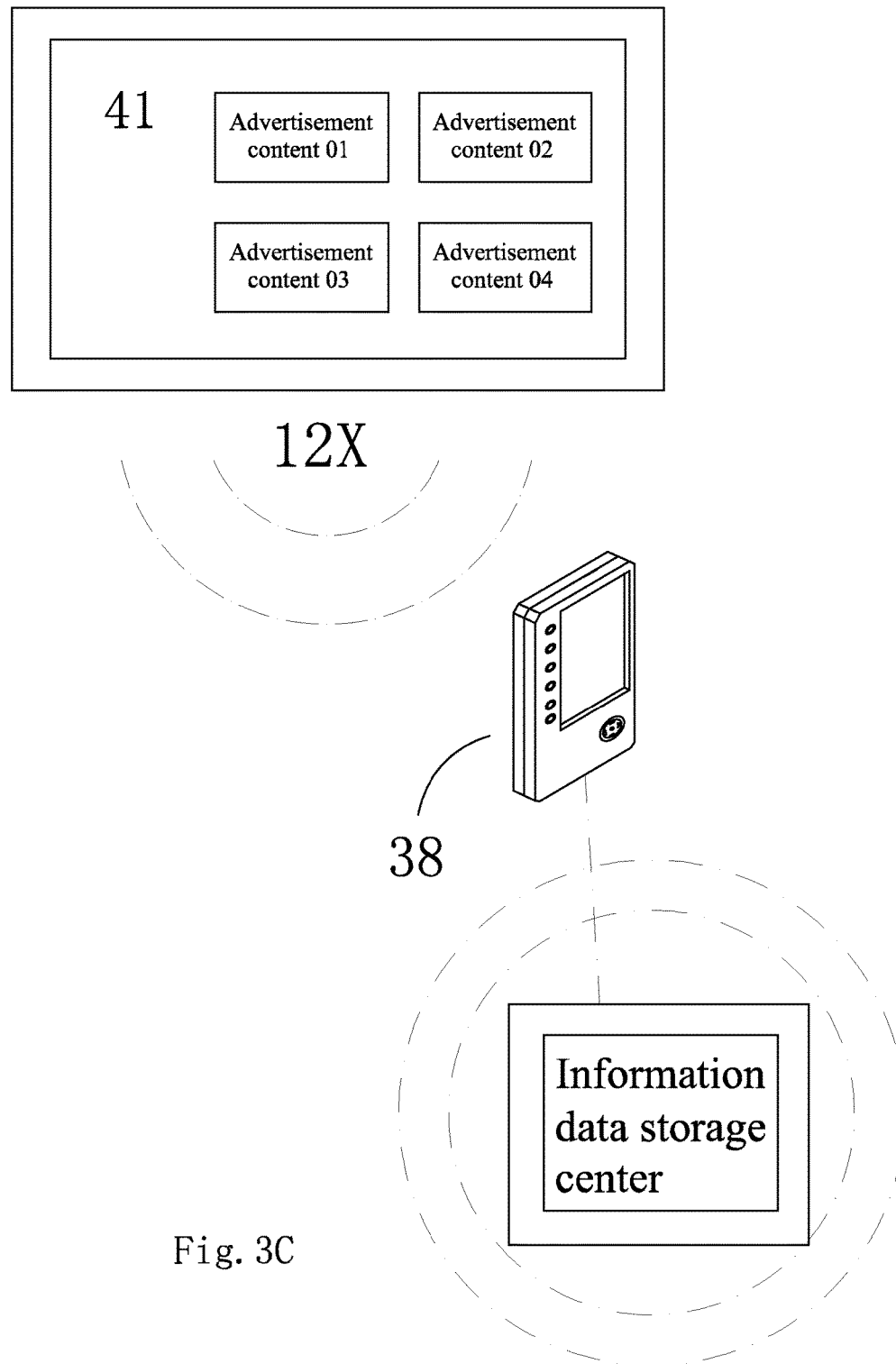
FIG. 3C is a design sketch of a plane media product supporting an interactive interconnected system.

As shown in FIG. 3B, a single QR code pattern (the planar information technology) is implanted into the traditional print advertisement board, and the advertisement content concerned by a reader is provided for the reader to see;

1. The QR code pattern is captured by the smart phone and processed and converted into the URI (Uniform Resource Identifier) . . . .

2. Access to the website of the relevant URI (Uniform Resource Identifier) . . . .

3. The traditional webpage search operation is carried out . . . .

Figure 4A:
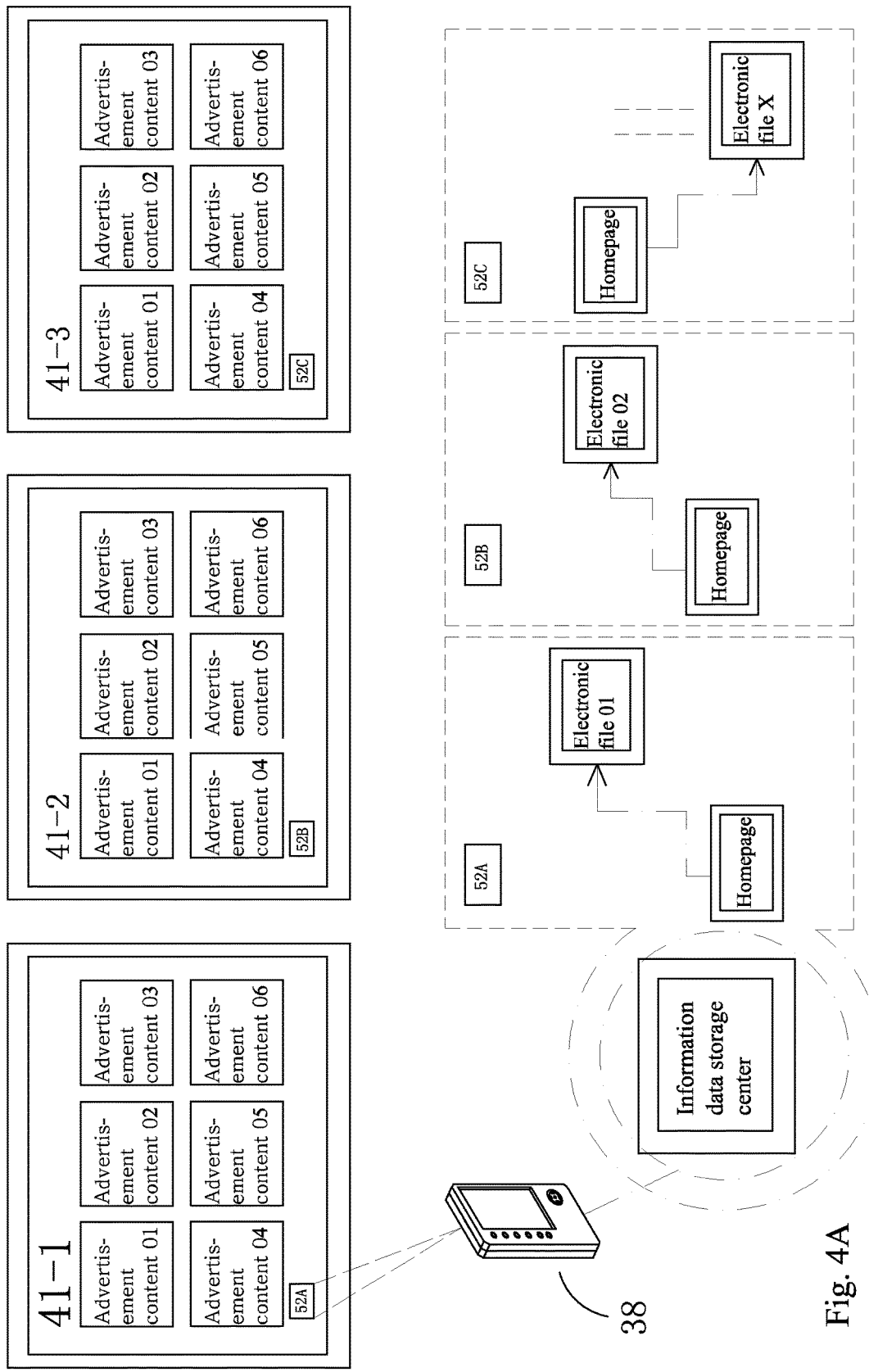
FIG. 4A is a design sketch of a traditional print advertisement board with an implanted QR code technology.

As shown in FIG. 4A, the QR code patterns have been implanted into three print advertisement boards of a station respectively (the planar information technology) to allow waiters to see the concerned advertisement contents;

1. The QR code pattern is captured by the smart phone and processed and converted into the URI (Uniform Resource Identifier) . . . .

2. Access to the website of the relevant URI (Uniform Resource Identifier) . . . .

3. Different series operating times shall be repeated for the different QR code patterns . . . .

It shall be especially emphasized that the operation will be very complicated if the QR code patterns attached to the three print advertisement boards are not associated with the information from the same electronic website.

The user shall capture the QR code patterns within a short time, which is a technical challenge.

The relevant embodiments of the invention are as follows.

First Mode:

The electronic reading device is provided with the combination data reception circuit, the combination data decomposition circuit, the transmission circuit, and a CPU (Central Processing Unit) module board, which are embedded into the plane media product supporting the interactive interconnected system; and the electronic transmitter-receiver is provided with an associated data reception circuit, an associated data transmission circuit and a central processing unit (with memory), which are embedded into a communication terminal product of the interactive interconnected system.

Due to the technical combination characteristic of the interactive interconnected system, original functions of the product are not changed, and combined functions can support mutually to achieve an obvious technical effect, and the barrier-free information connection of the cross-media product can be achieved by the simplest point-to-point association technology.

There are two operating methods for obtaining the associated data basically:

first method: on the smart phone (within an effective range), an association operation key 39 is pressed at will (to start the interactive interconnected system), and then the association operation key 39 is pressed again, so that the electronic transmitter-receiver can obtain the selected associated data (namely the URI (Uniform Resource Identifier)) from the electronic reading device;

second method: on the smart phone (within an effective range), the association operation key 39 is pressed at will (to start the interactive interconnected system), and then a corresponding figure (the electronic reading code) according to a figure implanted into the information content (a planar identification mark) is input, so that the electronic transmitter-receiver can obtain the selected associated data (namely the URI (Uniform Resource Identifier)) from the electronic reading device . . . .

Another use method is as follows: the user presses an enter key after accomplishing relevant steps of the first method or the second method, and the electronic transmitter-receiver can obtain the selected associated data from the electronic reading device for storage.

Afterwards, the set associated electronic file can be called out quickly anytime, and the associated data can be transmitted to the data storage center via the transmission circuit to quickly call out the set associated electronic file for viewing (or listening) on the smart phone.

Second Mode:

The combination data reception circuit, the combination data decomposition circuit, the transmission circuit and the CPU module board of the electronic reading device, as well as the associated data reception circuit, the associated data transmission circuit and a CPU module board (comprising the memory) of the electronic transmitter-receiver are placed in the plane media product.

Figure 2A:
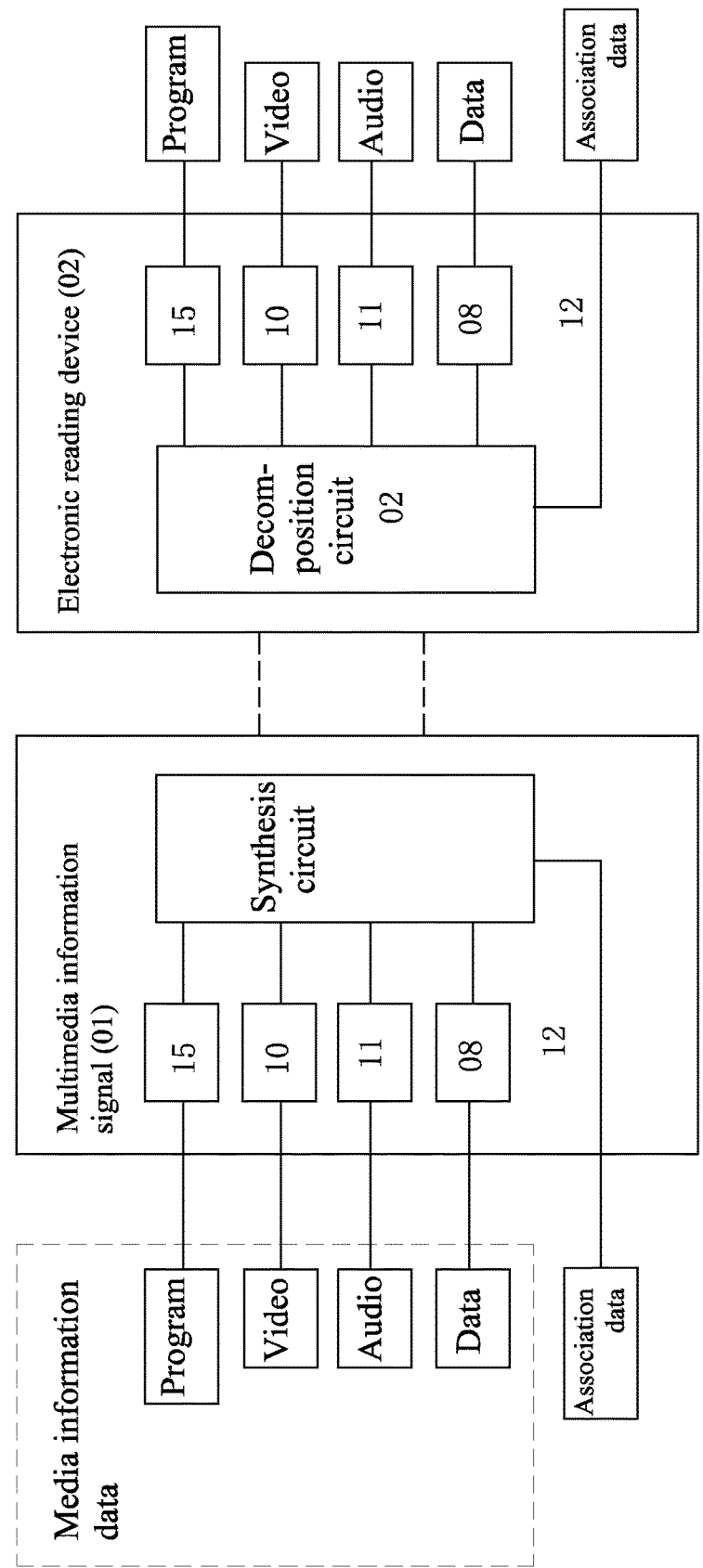
FIG. 2A is a principle diagram of a multimedia information signal supporting an interactive interconnected system.
Figure 2B:
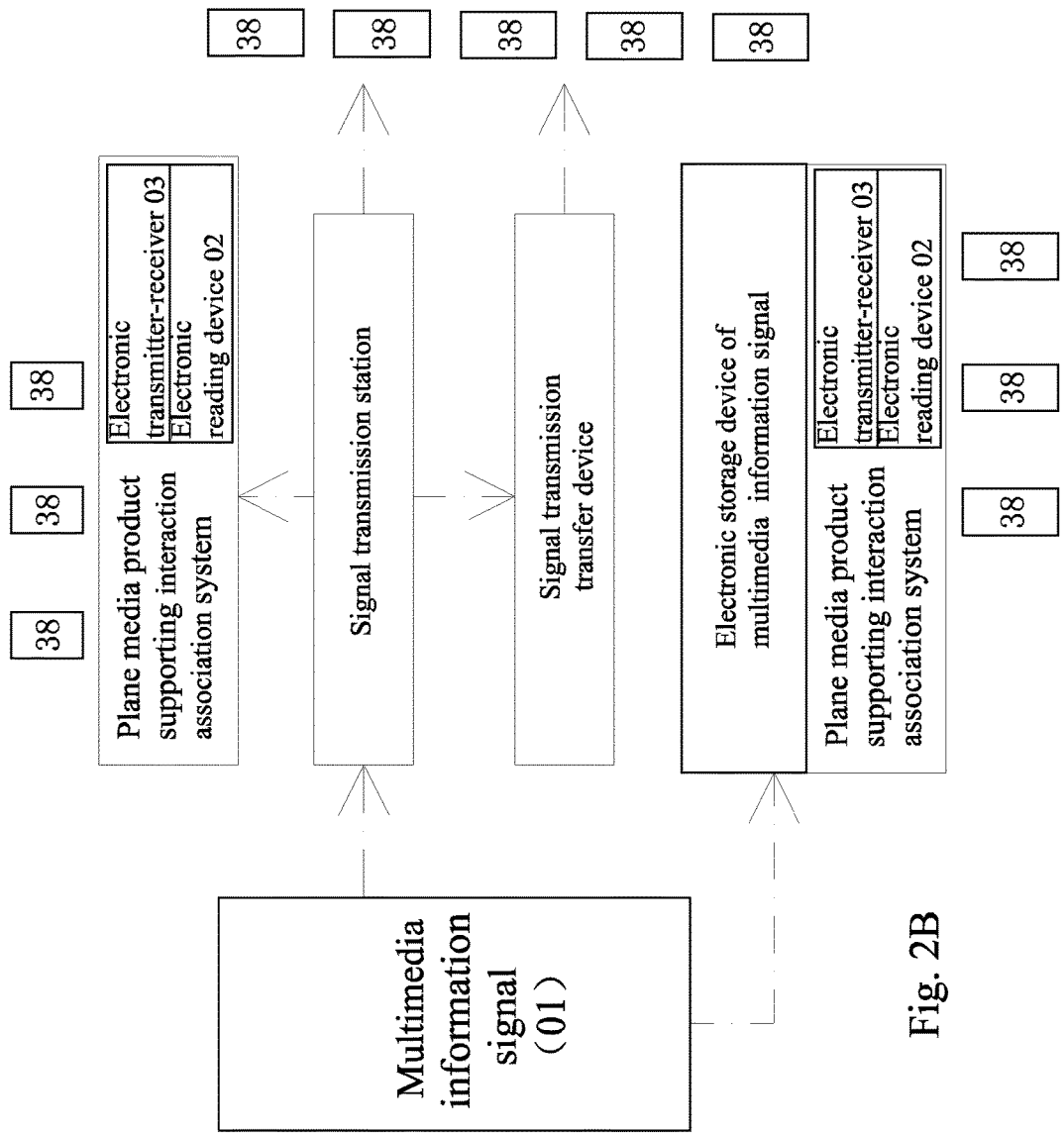
FIG. 2B is a schematic diagram of a technical application of an interactive interconnected system.

As shown in FIGS. 1A, 1C and 2B, the user receives the associated data from the plane media product supporting the interactive interconnected system via the communication terminal product (such as the smart phone) under the guidance (simple sound and light guidance) of the media information content of the plane media product, and then transmits the associated data synchronously to achieve a point-to-point effect.

It shall be especially emphasized that the mode can provide more conveniences for the visually impaired people and the deaf to use public facilities.

Figure 3D:
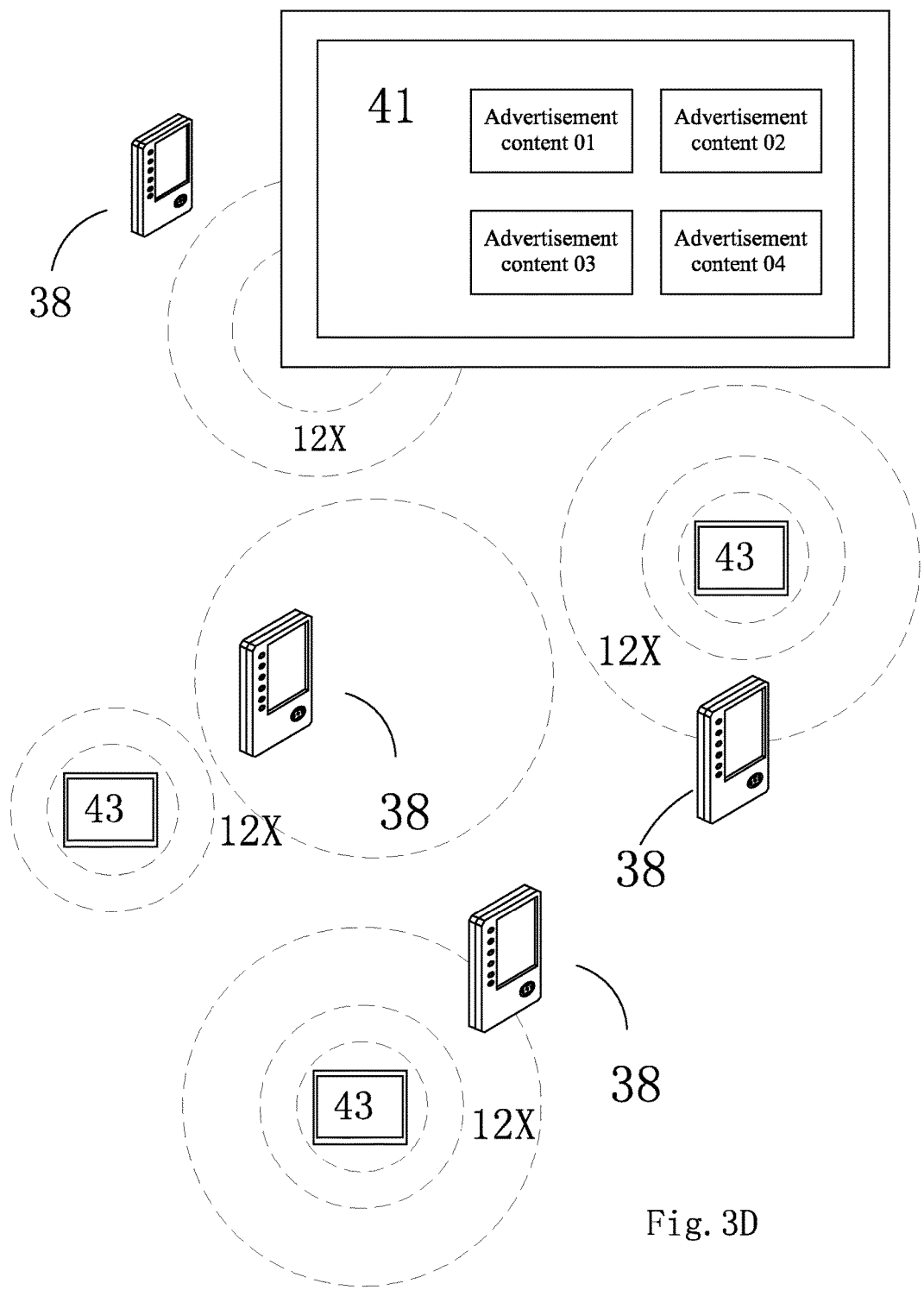
FIG. 3D is an application effect diagram of a mobile data box supporting an interactive interconnected system.

Third Mode: As Shown in FIG. 3D, the electronic reading device is provided with the combination data reception circuit, the combination data decomposition circuit, the transmission circuit, and the CPU module board, which are placed in the small data box 43 to facilitate carrying and use.

the transmission circuit of the electronic reading device is equipped with the short-distance signal transmission-reception circuit;

the combination data decomposition circuit of the electronic reading device is configured to decompose the multimedia information signal into the media information data that includes digital data 08, video data 10, audio data 11, program data 15, and the like;

the digital data after the decomposition of the media information data is transmitted to the related configuration for use after transmitted to a digital data system for processing;

the video data after decomposition of the media information data is transmitted to related configuration for use after transmitted to a video system for processing;

the audio data after the decomposition of the media information data is transmitted to the related configuration for use after transmitted to an audio system for processing; and the program data after the decomposition of the media information data is transmitted to the related configuration for use after transmitted to a program system for processing; and the decomposed associated data is transmitted by the transmission circuit and the equipped short-distance signal transmission-reception circuit.

As shown in FIG. 2B, the multimedia information signal is transmitted by a signal transmission station and a signal transmission transfer device.

As shown in FIG. 2A, the associated data received by the electronic transmitter-receiver is from various transmission approaches, and the electronic transmitter-receiver is connected with an electronic storage device of the multimedia information signal supporting the interactive interconnected system for reception.

The electronic storage device includes an electronic data memory, a compact disc, and the like.

The electronic transmitter-receiver is provided with the association operation key 39, and a signal induction device 36 supporting the interactive interconnected system.

The multiple replication and cyclic transmission are set for the associated data within the reading time of the media information data, the user is only required to press the association operation key 39, and the electronic transmitter-receiver is configured to receive the associated data decomposed by the transmission circuit of the electronic reading device, transmit the associated data to the external information data storage center via the remote wireless technology, and quickly call out the associated electronic file associated with the information data storage center.

Since many information signals exist in the atmosphere, the communication terminal product supporting the interactive interconnected system is provided with the signal induction device 36 (including light, sound and the like) to remind the user that the relevant associated data of the interactive interconnected system can be provided for a position range where the user is located . . . which particularly meets the requirements of the visually impaired people.

the association address data is association hybrid data 12M capable of being mixed with content data such as characters, images, audio and video, the association hybrid data 12M is decomposed into the associated data by an association hybrid data decomposition circuit, and the user can carry out selective operation according to the requirements via guide information such as the relevant characters, images, audio and video displayed on an electronic display screen of the electronic transmitter-receiver.

Embodiment 1

As shown in FIG. 3B,
the communication terminal product 38 (the smart phone) is matched with the plane media product for use, and the associated data can be obtained very easily with the first or second method . . . . Obviously, the visually impaired people can carry out operation and use.

Embodiment 2

Another important value of the invention is to support the barrier-free development of the information and utilize the existing advertisement board resources of the bus shelters in society:
1. Braille characters and braille icons are attached to the print advertisement boards of the station for guidance.
2. Prompts supporting the interactive interconnected system are provided on the print advertisement boards of the station to allow the visually impaired people to obtain the relevant traffic information and service from the smart phone supporting the interactive interconnected system.

Figure 4B:
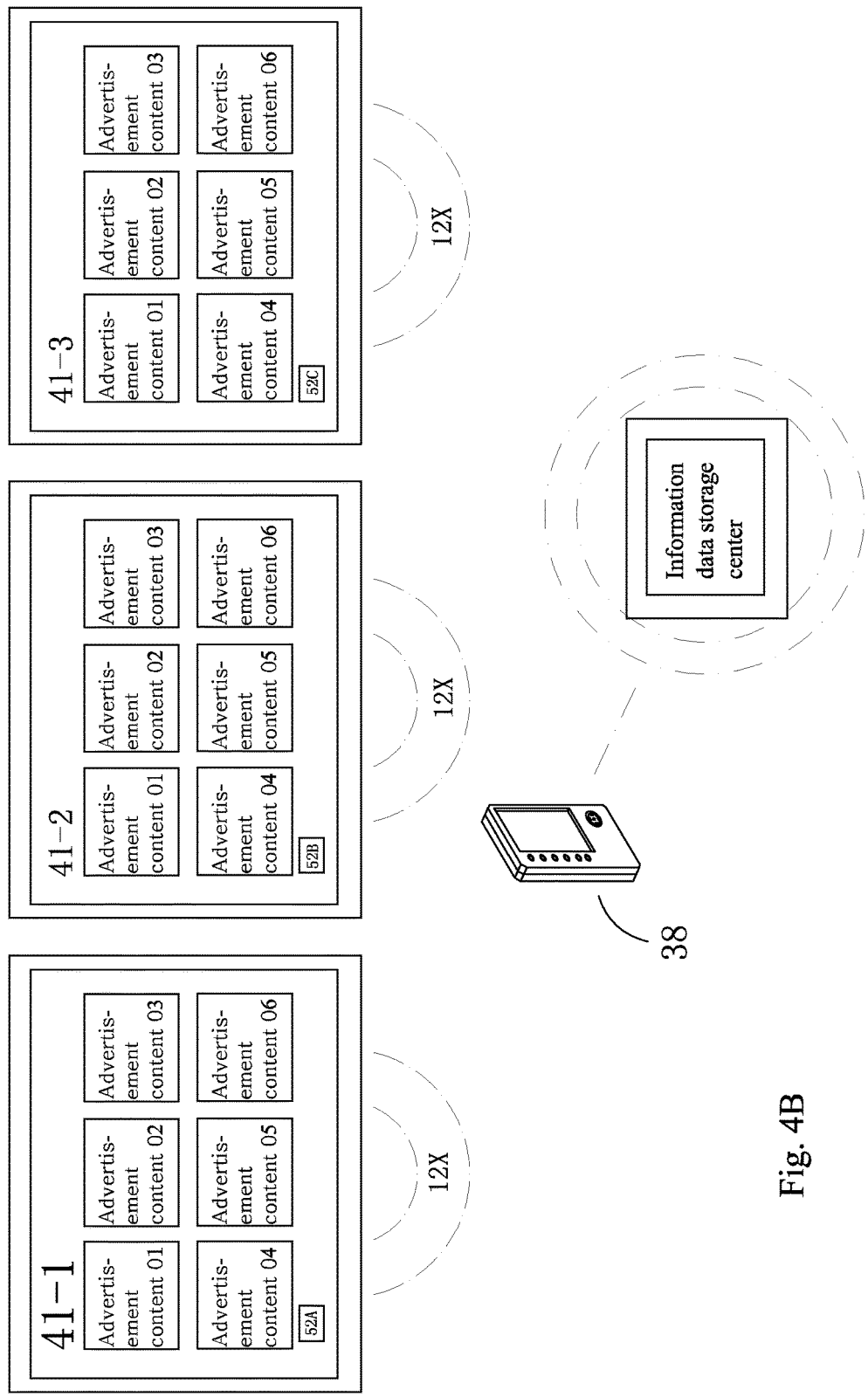
FIG. 4B is a design sketch of a print advertisement board supporting an interactive interconnected system.

As shown in FIG. 4B, the three print advertisement boards of the station adopts the technology of the second mode, the figures are implanted into advertisement contents of the print advertisement boards, and the print advertisement boards provide the relevant associated data (simple voice prompt) supporting the interactive interconnected system. As a result, the visually impaired people are able to use.

Embodiment 3

Figure 5A:
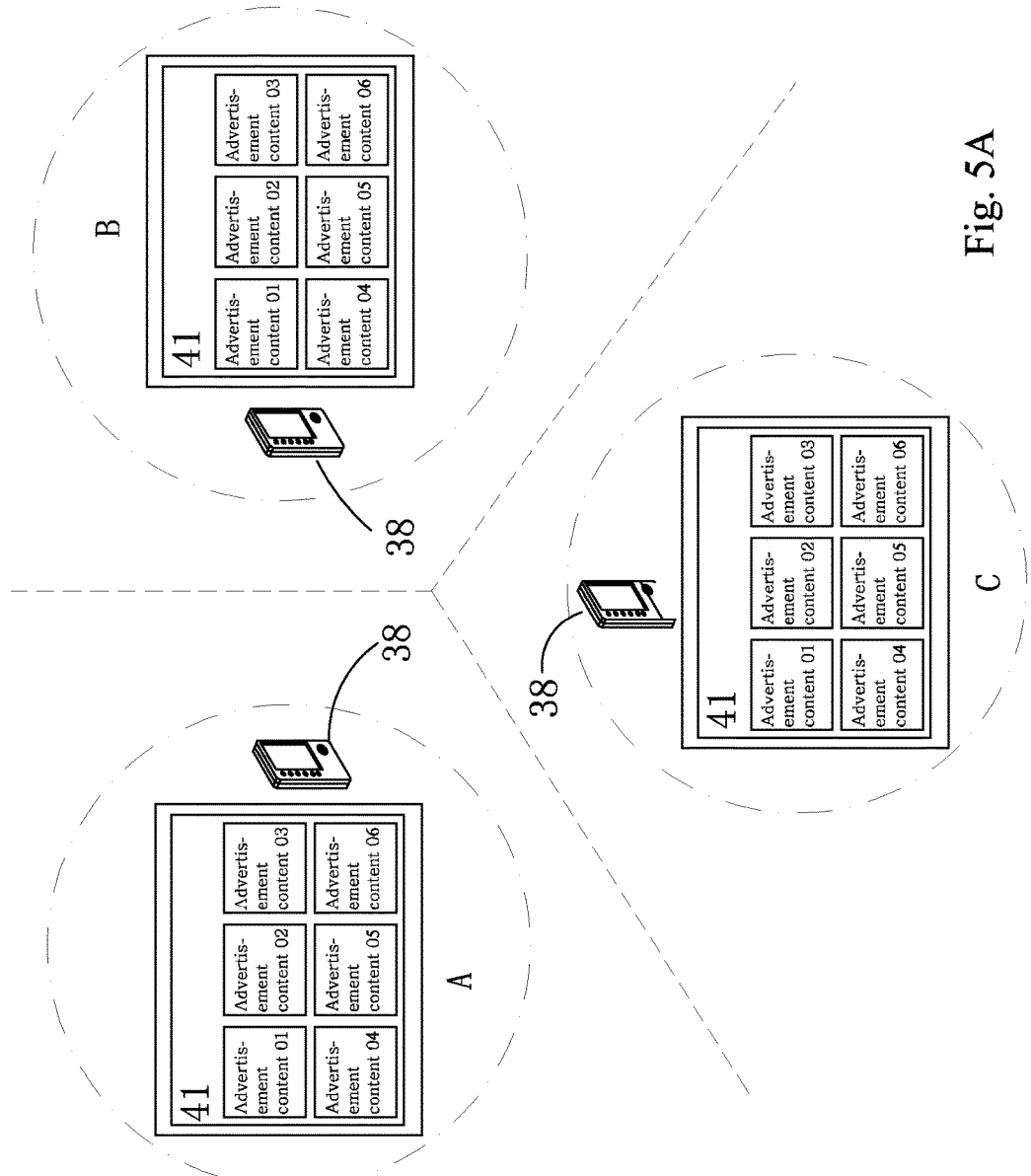
FIG. 5A is an application diagram of a point-to-point technology of an interactive interconnected system.

As shown in FIG. 5A, a large print advertisement board adopts the technical scheme of the invention, and a plurality of small data boxes 43 can be placed within a visual range of the advertisement content of the print advertisement board, so that users placing different roles and standing in different positions can easily obtain the relevant associated data of the content.

Embodiment 4

Figure 5B:
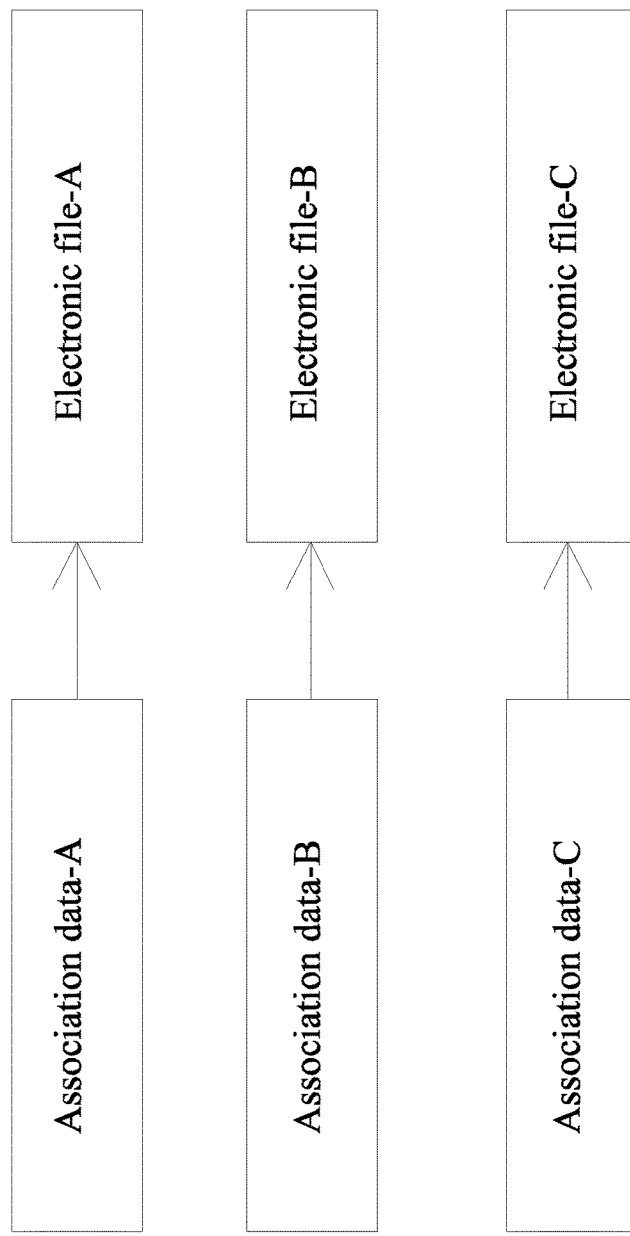
FIG. 5B is a design sketch of a point-to-point technology of an interactive interconnected system.

As shown in FIG. 5B, after a marketing promotion activity held by a certain company adopts the technical scheme of the invention, although the promotion activity employs a plane advertisement content designed uniformly, consumers in different promotion areas can obtain particular activity information of branches in the different areas;
as shown in FIG. 5C,
the consumer in the area A obtains the associated data A corresponding to the figure (the identification mark) via a smart phone (the associated data A corresponds to relevant electronic information provided by the branch of the area A) . . . .
However, the consumer in the area B obtains the associated data B corresponding to the figure (the identification mark) via a smart phone (the associated data B corresponds to relevant electronic information provided by the branch of the area B) . . . .
The consumer in the area C obtains the associated data C corresponding to the figure (the identification mark) via a smart phone
(the associated data C corresponds to relevant electronic information provided by the branch of the area C) . . . .
When the invention is compared with the operation of obtaining the associated data via the QR code patterns;
1. The interactive interconnected system shall be embedded into the smart phone for support, which is the same as the QR code patterns.
2. Obtaining of the associated data is much more sensitive and accurate than capturing of the QR code patterns.
3. The associated data can be obtained without influence of light conditions.
4. The distance for obtaining the associated data may be set within a range of tens of meters as required, and the invention is very stable, while the QR code pattern technical scheme has an operationable range of about 1 m under the normal condition.
5. The figures are used for replacing the QR code patterns, which can reduce the influence on the appearance attractiveness of the advertisement boards.

By reference to the effects of the above relevant embodiments, through the comparison between the invention and the relevant technical solutions and product schemes on the market, the invention is obviously superior to the others in use, operation, manufacturing cost and transmission effect, and the development of the invention will influence all links of a commercial chain, and create a brand-new commercial mode and value chain.

Although the invention is revealed through the above embodiments, the range of the invention is not limited to those, and the above members may be replaced by similar or identical elements realized by those skilled in the art under the condition of not deviating from the conception of the invention.

What is claimed is:
1. A plane media product supporting an interactive interconnected system, wherein the plane media product supporting transmit-receive of a multimedia information signal of the interactive interconnected system is characterized in that
the interactive interconnected system comprises an electronic reading device and an electronic transmitter-receiver;
an information content is attached to an external surface of the plane media product;

the multimedia information signal is synthesized by media information data and associated data;

the associated data is a preset URI (Uniform Resource Identifier);

the electronic reading device is provided with a combination data reception circuit, a combination data decomposition circuit, a module comprising a first Central Processing Unit, and a transmission circuit; the combination data reception circuit is configured to receive the multimedia information signal; the combination data decomposition circuit is configured to decompose the multimedia information signal into the media information data and the associated data; the decomposed associated data is transmitted to the electronic transmitter-receiver via the transmission circuit;

the electronic transmitter-receiver is provided with an associated data reception circuit, an associated data transmission circuit and a second central processing unit comprising a memory;

the associated data reception circuit is equipped with a short-distance signal transmission-reception circuit; and the electronic transmitter-receiver is mainly configured to control transmit-receive of the associated data of the decomposed multimedia information signal, receive the associated data decomposed by the transmission circuit of the electronic reading device, transmit the associated data to an external information data storage center via a remote wireless technology, and quickly call out an associated electronic file.

2. The plane media product supporting the interactive interconnected system of claim 1, wherein
an identification mark is attached to the external surface of the information content.

3. The plane media product supporting the interactive interconnected system of claim 1, wherein the plane media product is a fixed article.

4. The plane media product supporting the interactive interconnected system of claim 1, wherein the plane media product is a mobile article.

5. The plane media product supporting the interactive interconnected system of claim 1, wherein
the electronic reading device is provided with the combination data reception circuit, the combination data decomposition circuit, the transmission circuit, and the module comprising the first Central Processing Unit, which are embedded into the plane media product supporting the interactive interconnected system; and
the electronic transmitter-receiver is provided with the associated data reception circuit, the associated data transmission circuit and the second central processing unit comprising the memory, which are embedded into a communication terminal product of the interactive interconnected system.

6. The plane media product supporting the interactive interconnected system of claim 5, wherein
the transmission circuit of the electronic reading device is equipped with the short-distance signal transmission-reception circuit;
the combination data decomposition circuit of the electronic reading device is configured to decompose the multimedia information signal into the media information data that includes digital data, video data, audio data, program data;

the digital data after the decomposition of the media information data is transmitted to the related configuration for use after transmitted to a digital data system for processing;
the video data after decomposition of the media information data is transmitted to related configuration for use after transmitted to a video system for processing;
the audio data after the decomposition of the media information data is transmitted to the related configuration for use after transmitted to an audio system for processing; and
the program data after the decomposition of the media information data is transmitted to the related configuration for use after transmitted to a program system for processing; and
the decomposed associated data is transmitted by the transmission circuit and the equipped short-distance signal transmission-reception circuit.

7. The plane media product supporting the interactive interconnected system of claim 1, wherein
the combination data reception circuit, the combination data decomposition circuit, the module comprising the first Central Processing Unit, the transmission circuit as well as the associated data reception circuit, the associated data transmission circuit and the second central processing unit comprising the memory of the electronic transmitter-receiver are placed in the plane media product.

8. The plane media product supporting the interactive interconnected system of claim 7, wherein
the transmission circuit of the electronic reading device is equipped with the short-distance signal transmission-reception circuit;
the combination data decomposition circuit of the electronic reading device is configured to decompose the multimedia information signal into the media information data that includes digital data, video data, audio data, program data;
the digital data after the decomposition of the media information data is transmitted to the related configuration for use after transmitted to a digital data system for processing;
the video data after decomposition of the media information data is transmitted to related configuration for use after transmitted to a video system for processing;
the audio data after the decomposition of the media information data is transmitted to the related configuration for use after transmitted to an audio system for processing; and
the program data after the decomposition of the media information data is transmitted to the related configuration for use after transmitted to a program system for processing; and
the decomposed associated data is transmitted by the transmission circuit and the equipped short-distance signal transmission-reception circuit.

9. The plane media product supporting the interactive interconnected system of claim 1, wherein
the electronic reading device is provided with the combination data reception circuit, the combination data decomposition circuit, the transmission circuit, and the module comprising the first Central Processing Unit, which are placed in a small data box.

10. The plane media product supporting the interactive interconnected system of claim 9, wherein the transmission circuit of the electronic reading device is equipped with the short-distance signal transmission-reception circuit;

the combination data decomposition circuit of the electronic reading device is configured to decompose the multimedia information signal into the media information data that includes digital data, video data, audio data, program data;

the digital data after the decomposition of the media information data is transmitted to the related configuration for use after transmitted to a digital data system for processing;

the video data after decomposition of the media information data is transmitted to related configuration for use after transmitted to a video system for processing;

the audio data after the decomposition of the media information data is transmitted to the related configuration for use after transmitted to an audio system for processing; and the program data after the decomposition of the media information data is transmitted to the related configuration for use after transmitted to a program system for processing; and the decomposed associated data is transmitted by the transmission circuit and the equipped short-distance signal transmission-reception circuit.

11. The plane media product supporting the interactive interconnected system of claim 1, wherein
the multimedia information signal is transmitted by a signal transmission station and a signal transmission transfer device.

12. The plane media product supporting the interactive interconnected system of claim 1, wherein
the associated data is transmitted from various transmission approach, the associated data is received by the electronic transmitter-receiver, the electronic transmitter-receiver is connected with an electronic storage device supporting the interactive interconnected system.

* * * * *